May 11, 1954
P. ARANT
2,678,158
ANIMAL TRAINING PADDLE
Filed Aug. 22, 1950
2 Sheets-Sheet 1
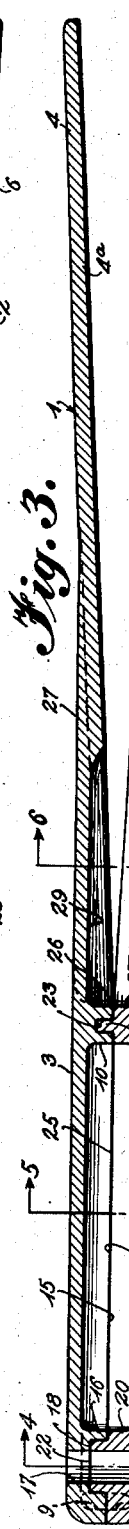
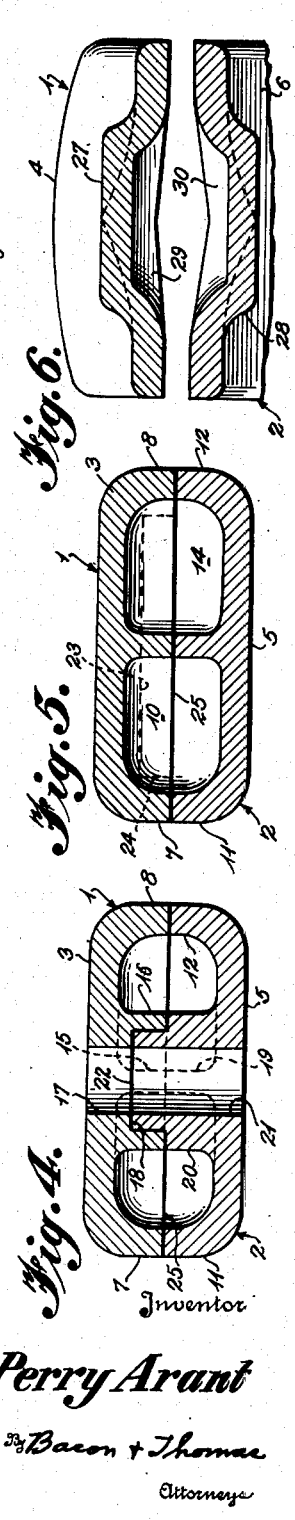
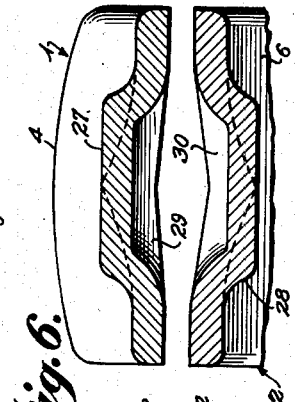
Inventor
*Perry Arant*
By Bacon + Thomas
Attorneys May 11, 1954
P. ARANT
2,678,158
ANIMAL TRAINING PADDLE
Filed Aug. 22, 1950
2 Sheets-Sheet 2
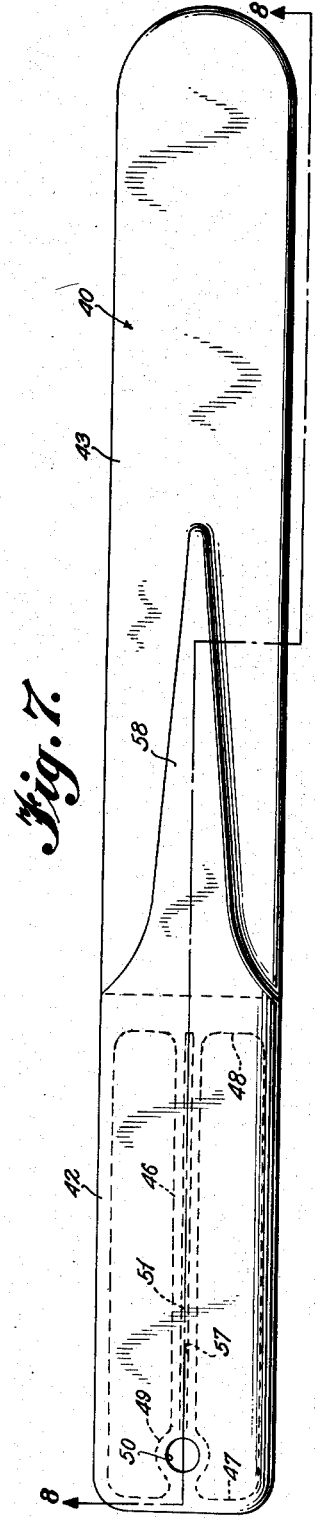
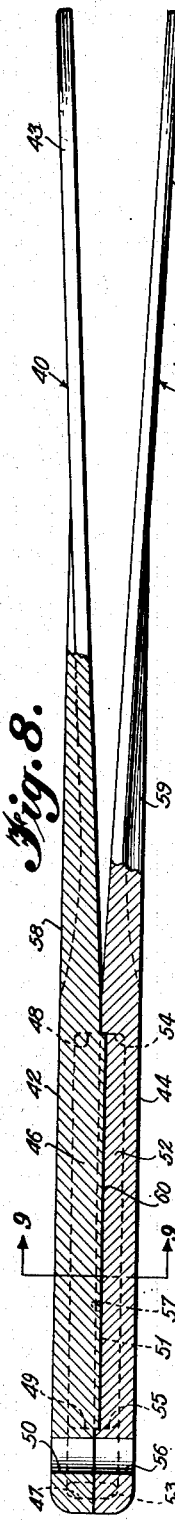
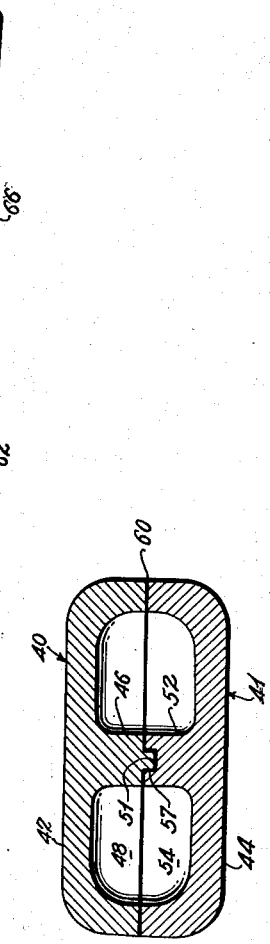
Inventor
Perry Arant
By Bacon + Thomas
Attorneys Patented May 11, 1954

2,678,158

UNITED STATES PATENT OFFICE 2,678,158

ANIMAL TRAINING PADDLE

Perry Arant, San Gabriel, Calif.

Application August 22, 1950, Serial No. 180,825

11 Claims. (Cl. 231—2)

The present invention relates to a device for use in training animals, and more particularly, to a paddle-like device for use in training, and controlling the behavior of, domestic pets, such as dogs; although the device is also useful in training other animals, such as horses.

More specifically, the invention relates to a paddle-like device having a handle and a pair of spaced apart flexible blades extending from one end of the handle and adapted to be brought into engagement with a sharp startling noise when one of the blades is forcibly engaged with the body of an animal, as in delivering a light blow or tap to the animal, to command obedience or attention. The animal, during training, not only responds to the slight sting of the blow but also to the noise produced by the blades, the combination of the two producing the necessary "surprise" and "shock" most effective for quick response and obedience. Actual experience has demonstrated that the animal quickly acquires a strong dislike for the sparp noise or cracking sound alone so that in a short time it becomes only necessary to display the paddle in order to obtain instant obedience.

The principal object of the invention is to provide an animal training device which, while quite effective, will not injure or harm the animal in any way.

Another object of the invention is to provide an animal training paddle that will produce both a "shock" and "surprise" effect on the animal through the delivery of a light blow accompanied by a sharp startling noise.

A further object of the invention is to provide an animal training paddle which can be readily molded from either transparent or colored plastic materials having the properties of flexibility and great strength and durability.

Another object of the invention is to provide a molded plastic animal training paddle which requires a minimum amount of molding material in its fabrication.

Another object of the invention is to provide a sectionally molded animal training paddle in which the sections are provided with means for quickly aligning the same to facilitate rapid assembly and produce a neat appearing article.

Still another object of the invention is to provide a training paddle constructed so that a sharp startling noise can be made by a flick of the wrist in the air and without necessarily delivering a blow to the animal.

Other objects and features of the invention will be apparent from the following description taken in conjunction with the accompanying drawings, in which:

Fig. 1 is a plan view of one form of training paddle embodying the principles of the present invention;

Fig. 2 is a side elevational view of the training paddle shown in Fig. 1;

Fig. 3 is a longitudinal sectional view taken on the line 3—3 of Fig. 1;

Fig. 4 is an enlarged transverse sectional view taken on the line 4—4 of Fig. 3 through the portion of the paddle handle which is provided with an aperture for a wrist cord;

Fig. 5 is an enlarged transverse sectional view taken on the line 5—5 of Fig. 3 through another portion of the handle;

Fig. 6 is an enlarged transverse sectional view taken on the line 6—6 of Fig. 3 through the blade portions of the paddle adjacent the inner end of the handle;

Fig. 7 is a plan view of another form of training paddle;

Fig. 8 is a partial sectional view taken on the line 8—8 of Fig. 7;

Fig. 9 is an enlarged transverse sectional view through the handle of the paddle, taken on the line 9—9 of Fig. 8; and Fig. 10 is a side elevational view of another embodiment of the invention in which one of the flexible blades is made substantially thinner than the other so that the two blades can be brought into contact to make a sharp noise simply by a flick of the wrist in the air.

The several different training paddles disclosed herein are each preferably formed from two separately molded paddle sections of any suitable plastic material, either transparent or colored. Colored or clear cellulose acetate plastic, cellulose acetate butyrate plastic, methyl methacrylate, etc., may be employed in molding the paddle sections, but it is to be understood that any suitable plastic material either clear or of any given color may be employed, if desired. Conventional and well known plastic materials known to the trade as "Tenite," "Lucite" and "Plexiglas" may be employed in fabricating the paddle sections, if desired. Red-colored paddles of commercially available cellulose acetate butyrate plastic have been found to be very satisfactory because of ready visibility. On the other hand, clear or transparent "Lucite" paddles, which are not so readily noticeable, contribute to the element of surprise in the technique of training dogs. In all instances, the paddle sections are preferably secured together by a suitable quick-setting cement, such as acetone, or a mixture of acetone and butyrate consisting of about 90% acetone by weight and about 10% butyrate by weight. This cement is applied only to the confronting handle portions of the paddle sections, and after application of the cement, the paddle sections are pressed tightly together in a clamp while the cement sets.

Referring now in particular to the form of training paddle illustrated in Figs. 1 to 6, inclusive, the paddle comprises two separately molded paddle sections generally identified by the numerals 1 and 2, respectively. The paddle section 1 comprises a hollow handle portion 3 and a blade portion 4 formed integrally therewith and extending from one end thereof but with the inner flat face 4a of the blade portion lying in a plane on an angle of about 3° with respect to the lower face of the handle portion 3. In other words, the paddle section 1 is molded in such manner that the blade portion 4 thereof is offset or lies on an angle of about 3° with respect to a line X passing through the center of the paddle handle. The paddle section 2 is similarly molded and includes a hollow handle portion 5 and a flexible blade portion 6 having a flat inner face 6a. Thus, the blade portions 4 and 6 diverge, with the apex of the angle of divergence located on the line X at the inner end of the handle portions 3 and 5.

The hollow handle portion 3 of the blade section 1 includes longitudinally extending side walls 7 and 8 which are interconnected by an outer transverse end wall 9 and an inner transverse end wall 10. The handle portion 5 of the blade section 2 has generally similar side walls 11 and 12 and transverse end walls 13 and 14. A longitudinally extending reinforcing web 15 is disposed within the handle 3 between the walls 9 and 10 and has an enlarged boss portion 16 disposed inwardly from the end wall 9, said boss portion being provided with an aperture 17 and a shouldered recess 18. A somewhat similar handle reinforcing web 19 is formed in the handle portion 5 and has a boss portion 20 disposed inwardly from the end wall 13, said boss being provided with an aperture 21 adapted to be aligned with and of the same size as the aperture 17, and having a projection 22 which engages in the shouldered recess 18.

The inner transverse wall 10 of the handle portion 3 is provided with a recess 23, which terminates short of the side edges of the handle portion 3, and the corresponding transverse wall 14 of the handle portion 5 carries a rib or projection 24, which snugly fits into the recess 23. The confronting surfaces of the handle portions 3 and 5 are permanently secured together by acetone or any suitable cement 25 (diagrammatically indicated by a heavy line) interposed therebetween. The interengaging recess 18 and projection 22, and the interengaging recess 23 and rib 24 of the handle portions 3 and 5 not only facilitate rapid assembly of the paddle sections 1 and 2, but provide for maintaining the paddle sections 1 and 2 in longitudinal and transverse alignment during the setting of said cement. A clamp (not shown) is preferably employed to press the handle sections 3 and 5 toward each other while the cement 25 sets.

The blade portions 4 and 6 are spaced apart, and preferably diverge outwardly from the point 26 at the inner ends of the handle portions 3 and 5, and ribs 27 and 28, respectively, extend from said handle portions as extensions therefrom and taper and blend into the outer sides of said blade portions, as shown. A part of the blade portions 4 and 6 is hollowed out in the zone of the ribs 27 and 28, as indicated at 29 and 30, respectively, in order to provide a more uniform transverse cross-sectional area and to save material. Making the handle portions 3 and 5 of hollow formation also results in a substantial saving of material.

It will be noted that the inner faces 4a and 6a of the blades 4 and 6 are straight, flat, and spaced apart, and, in fact, diverge outwardly from the handle portions 3–5 from the point 26 where the transverse walls 10 and 14 terminate or from a point medially of the overall thickness of the handle portions 3—5 from the point 26 where operative example of the invention, the paddle has an overall length of about 12″ and the blade sections 1 and 2 are made about 1⅜″ in width, with the handle portions 3 and 5 about 4″ long to the point 26 and the blade portions 4 and 6 about twice as long as the handle portions, or 8″ long from the point 26 to the outer ends of the blades. The blades 4 and 6 are flexible and have a substantially uniform thickness of about .10″ and their extremities are rounded on a true radius as indicated at 31 to eliminate any sharp corners that might injure the animal. The exposed edges of the handle portions 3 and 5, and blades 4 and 6 are rounded, and the liberal width of said blades assures against serious injury while providing the desired sting under a light blow. The extremities of the blades 4 and 6 are spaced apart a distance of about ¾″, and the overall thickness of each of the handle portions 3 and 5 is about $\tfrac{5}{16}$″.

The blades 4 and 6 are sufficiently flexible to produce a loud cracking noise as the paddle delivers a gentle blow to the animal being trained. The blow is preferably of sufficient force to mildly sting the animal, and the noise accompanying the blow adds to the alacrity with which the animal responds in attention and obedience to commands. The animal soon learns to respect and understand the purpose of the paddle in the hand of its trainer, so that the paddle, together with a spoken command, assures prompt obedience.

Referring now to the form of training paddle illustrated in Figs. 7 to 9, inclusive, the principal differences therein over the structure described above and shown in Figs. 1 to 6, inclusive, resides in the details of the handle structure. Thus, the training paddle disclosed in Figs. 7 to 9 comprises molded plastic paddle sections 40 and 41, with the section 40 comprising a hollow handle portion 42 and a blade portion 43 and the section 41 comprising a hollow handle portion 44 and a blade portion 45. The handle portion 42 contains a longitudinal reinforcing web 46 extending between end walls 47 and 48 thereof and which web is enlarged, as indicated at 49, to provide an aperture 50. A rib or tongue 51 projects from the lower side of the reinforcing web 46 from a point adjacent the aperture 50 to the end wall 48. The handle portion 44, on the other hand, is provided on the interior thereof with a generally similar longitudinal reinforcing web 52 extending between end walls 53 and 54, and including an enlarged portion 55 adapted to be aligned with the enlarged portion 49 and an aperture 56 adapted to be aligned with the aperture 50, so that an opening for a wrist cord (not shown) extends entirely through the handle of the paddle. The reinforcing web 52 is provided with a longitudinally extending groove 57 for the reception of the rib or tongue 51. The groove 57 is of a length equal to the length of the tongue 51 so that when said tongue is inserted into said groove, the two paddle sections 40 and 41 are accurately aligned, both longitudinally and transversely. Exposed ribs 58 and 59 taper outwardly as extensions from the handle portions 42 and 44, respectively, and merge into the spaced or diverging blades 43 and 45, respectively.

The paddle sections 40 and 41 are secured together by a layer of acetone or any other suitable cement 60 (diagrammatically shown by heavy lines), interposed between the confronting faces of their handle portions 63 and 64 for permanently bonding the paddle sections together. Here again, the interengaging tongue 51 and groove 57 facilitate rapid assembly of the paddle sections 40 and 41 and assure a neat appearance in the finished article. The paddle sections are preferably clamped together under pressure until the cement 60 sets.

Fig. 10 illustrates a training paddle comprising molded paddle sections 61 and 62 having handle portions 63 and 64 which may be made identical to either the handle portions 3—5, or 42—44. However, the paddle section 61 has a blade portion 65 that is made substantially thinner than, or about half as thick as, the blade portion 66 of the paddle section 62. The handle portions 63 and 64 are secured together by cement 67 (shown by heavy line), or fastened together in any other suitable manner. A rib similar to ribs 28 or 59 extends from the handle portion 64 and merges into blade 66. A corresponding rib is preferably omitted from the paddle section 61 to increase the flexibility of the thin blade 65.

The blade portion 65, being much thinner than the blade portion 66, will flex much more readily than the blade portion 66 and, in fact, is made thin enough so that it will flex and slap against the blade portion 63 and make a loud noise, simply by a quick flick of the wrist in the air. Of course, a noise will also be produced if the trainer strikes the animal or some suitable object a light blow with the paddle. This form of paddle is particularly adapted for use in cases where the animal is pretty well trained, or is physically out of reach, and attention or obedience is desired in response to the noise made by the paddle unaccompanied by the slight sting delivered by a blow.

It will be understood that changes in the details of construction and design of the several training paddles disclosed herein may be made without departing from the principles of the invention, and that any suitable material may be employed in constructing the paddles. It will also be apparent that the dimensions of the paddle structure disclosed herein can be varied within limits without deviating from the invention.

I claim:

1. An animal training paddle, comprising: a pair of elongated juxtaposed paddle sections, each section including a handle portion and a flexible blade portion extending from the inner end thereof and with each blade portion offset relative to its handle portion, said handle portions including surfaces abutting each other transversely along their inner ends throughout the width thereof, said sections being arranged so that said blade portions are disposed in spaced apart relation in a region beyond said handle portions; and means fastening said handle portions together.

2. An animal training paddle, comprising: a pair of molded plastic paddle sections, each section including a handle portion and a flexible blade portion, with the blade portions extending at a slight angle from the confronting faces of their associated handle portions, said sections being arranged so that said blade portions diverge outwardly with respect to each other in a direction away from said handle portions; and adhesive means integrally bonding the plastic handle portions of the paddle together.

3. An animal training paddle, comprising: a pair of elongated juxtaposed plastic paddle sections, each section including a handle portion and a flexible blade portion with the blade portions extending angularly from the confronting faces of their associated handle portions, said sections being arranged so that said blade portions are substantially in contact at the inner end of the handle portions and are spaced apart in a region beyond said handle portions; means positioning said sections in predetermined longitudinal and transverse alignment; and means securing said handle sections together in said predetermined position of alignment.

4. An animal training paddle, comprising: a pair of elongated juxtaposed plastic paddle sections, each section including a rigid handle portion and a relatively flexible blade portion with each blade portion offset at a slight angle relative to its handle portion, said sections being arranged so that said blade portions diverge outwardly from the confronting faces of said handle portions, one of said handle portions having projecting means extending therefrom and the other handle portion having recess means snugly receiving said projecting means for positioning the two sections in predetermined longitudinal and transverse alignment; and means securing said sections together in aligned relation.

5. An animal training paddle, comprising: a pair of molded plastic paddle sections, each section including a handle portion and a flexible blade portion with each blade portion offset relative to its handle portion, said handle portions including transverse surfaces at their inner ends that are in contact throughout the width thereof, said sections being arranged so that said blade portions are spaced apart beyond said transverse surfaces of said handle portions, one handle portion having projecting means adjacent the opposite extremities thereof and the other handle portion having recess means to receive said projecting means, whereby the handle portions are adapted to be quickly assembled and maintained in predetermined alignment; and means securing the handle portions together in aligned relation.

6. An animal training paddle, comprising: a pair of molded plastic paddle sections, each section including a handle portion and a flexible blade portion with each blade portion offset at a slight angle relative to its handle portion, said sections being arranged so that said handle portions are parallel and confront each other and said blade portions diverge outwardly from said handle portions with the apex of the angle of divergence located at the inner end of said handle portions, one handle portion having an annular projection on the side thereof confronting the other handle portion and the other handle portion having a recess to receive said annular projection, and one handle portion having a transverse rib projecting therefrom on the side thereof confronting the other handle portion, and the other handle portion having a transverse recess snugly receiving said rib, whereby the handle portions are adapted to be quickly assembled and maintained in predetermined longitudinal and transverse alignment; and means securing the handle portions together in aligned relation.

7. An animal training paddle, comprising: a pair of molded plastic paddle sections, each section including a handle portion and a flexible blade portion with each blade portion offset at a slight angle relative to its handle portion, said sections being arranged so that said handle portions are parallel and confront each other and said blade portions diverge outwardly from said handle portions with the apex of the angle of divergence located at the inner end of said handle portions, one handle portion having an annular projection adjacent one extremity thereof remote from its blade portion and the other handle portion having a correspondingly located recess to receive said annular projection, and one handle portion having a transverse rib projecting therefrom adjacent the blade end thereof, and the other handle portion having a correspondingly located transverse recess snugly receiving said rib, whereby the handle portions are adapted to be quickly assembled and maintained in predetermined longitudinal and transverse alignment; and means securing the handle portions together in aligned relation.

8. An animal training paddle as defined in claim 1, in which the blade portions are about twice as long as the handle portions.

9. An animal training paddle as defined in claim 1, in which one of the blade portions is substantially thinner than the other blade portion and is actuatable into slapping engagement with said other blade portion by a flick of the wrist in the air.

10. An animal training paddle as defined in claim 5 in which one handle portion has a longitudinally extending rib projecting therefrom on the face thereof confronting the other handle portion, and said other handle portion has a longitudinal groove of a size to snugly receive said rib.

11. An animal training paddle as defined in claim 5, in which the handle portion of the paddle section is hollow and one handle portion has a longitudinally extending reenforcing rib therein and a projection carried by said web, and the other hollow handle portion has a longitudinally extending reenforcing rib therein, provided with a recess of a size to snugly receive said projection.

References Cited in the file of this patent

UNITED STATES PATENTS

| Number | Name | Date |
| --- | --- | --- |
| 770,386 | Reineman | Sept. 20, 1904 |
| 1,356,799 | Tompson | Oct. 26, 1920 |
| 1,886,130 | Smith | Nov. 1, 1930 |
| 2,499,794 | Stevens | Mar. 7, 1950 |

FOREIGN PATENTS

| Number | Country | Date |
| --- | --- | --- |
| 4,426 | Great Britain | 1910 |

OTHER REFERENCES

Karl Fischer Catalogue Sheet, pages 83, 84, Jan. 27, 1913. (Pub. by Carl Fischer, Cooper Sq., N. Y. One sheet received in Div. 57, Jan. 27, 1913, and now on file in Class 46, Sub. 174.)

Popular Mechanics Clipping, Issue of Dec. 1939, page 944. (One sheet now on file in Div. 53 in Class 231, Sub. 2.)